United States Patent [19]

Cassidy

[11] Patent Number: 4,921,738

[45] Date of Patent: May 1, 1990

[54] $Li_2O$-$Al_2O_3$-$SiO_2$ GLASS CERAMIC-ALUMINUM CONTAINING AUSTENITIC STAINLESS STEEL COMPOSITE BODY AND A METHOD OF PRODUCING THE SAME

[75] Inventor: Roger T. Cassidy, Monroe, Ohio

[73] Assignee: The United States of America as represented by the United States Department of Energy, Washington, D.C.

[21] Appl. No.: 281,729

[22] Filed: Dec. 9, 1988

[51] Int. Cl.[5] .................. B32B 15/00; B32B 17/00
[52] U.S. Cl. ...................... 428/34.6; 428/34.4; 428/212; 428/432; 428/433; 428/420; 428/446; 428/450; 428/472; 428/701; 174/268
[58] Field of Search ............... 428/34.1, 34.4, 34.6, 428/432, 433, 450, 472, 446, 76, 704, 701, 469, 427, 212, 420; 174/52 FP; 156/89

[56] References Cited

U.S. PATENT DOCUMENTS

| | | | |
|---|---|---|---|
| 4,050,956 | 9/1977 | de Bruin et al. | 148/6 |
| 4,109,054 | 8/1978 | Burgyan | 428/433 |
| 4,128,697 | 12/1978 | Simpson | 428/433 |
| 4,149,910 | 4/1979 | Popplewell | 148/6.35 |
| 4,784,974 | 11/1988 | Butt | 437/221 |

*Primary Examiner*—Ellis P. Robinson
*Assistant Examiner*—Archene A. Turner
*Attorney, Agent, or Firm*—Armand McMillen; James H. Chafin; William R. Moser

[57] ABSTRACT

The present invention relates to a hermetically sealed $Li_2O$-$Al_2O_3$-$SiO_2$ glass ceramic-aluminum containing stainless steel composite body and a method of producing the body. The composite body includes an oxide interfacial region between the glass ceramic and metal, wherein the interfacial region consists essentially of an $Al_2O_3$ layer. The interfacial $Al_2O_3$ region includes constituents of both the metal and glass ceramic.

9 Claims, 9 Drawing Sheets

Fig. 4a
ALLOY 899
304-L/sb glass
(100X)

Fig. 4b
304-L/sb glass
(100X)

Fig. 5

Fig. 6a
ALLOY 896
(500X)

Fig. 6b
ALLOY 896
post sb-glass seal cycle
(500X)

LI$_2$O-AL$_2$O$_3$-SIO$_2$ GLASS CERAMIC-ALUMINUM CONTAINING AUSTENITIC STAINLESS STEEL COMPOSITE BODY AND A METHOD OF PRODUCING THE SAME

BACKGROUND OF THE INVENTION

The present invention relates generally to glass hermetically sealed ceramic-metal composite bodies and a method of producing the composite bodies. More particularly, the present invention relates to composite bodies of Li$_2$O-Al$_2$O$_3$-SiO$_2$ glass ceramic bonded within a generally cylindrical aluminum containing austenitic stainless steel member and a superior method of hermetically sealing the glass ceramic to the metallic member. The government has rights in this invention pursuant to Contract No. DE-AC04-76DP00053 awarded by the U.S. Department of Energy to EG & G Mound Applied Technologies (formerly Monsanto Research Corp.)

In the manufacture of glass ceramic-metal composite bodies, it is necessary that the thermal expansion coefficient of the glass ceramic substantially match that of the metal member, such that when the composite body is cooled during manufacturing, the hermetic seal between the glass ceramic and metal will not crack due to stresses resulting from differential thermal expansion. Ideally, the hermetic sealed composite body, particularly the seal portion thereof, should be under a slight compression after cooling, such that the metal member is tightly fixed around and bonded to the glass ceramic. To achieve the desired thermal expansion coefficient matching, it is necessary to substantially crystallize the glass ceramic, which is accomplished by a crystallization heat treatment. Substantial crystallization of the glass ceramic also provides the composite body, particularly the glass ceramic portion thereof, with high resistance to chemical attack.

Additionally, the metal member should be compatible with the glass ceramic during the sealing operation, such that no adverse reactions occur at the hermetic sealing interface which would otherwise deteriorate the seal between the metal member and the glass ceramic.

It has been known to seal lithia-alumina-silica glass ceramic to Inconel 718 (hereinafter IN-718), which is essentially a nickel-chromium alloy. However, various drawbacks have been encountered in such composite bodies as well in the manufacture thereof.

For instance, during the sealing process and before the glass ceramic is substantially crystallized (i.e., when the material is still in a glassy state), chromium and iron migrate from the IN-718 member into the LAS glass. Such migration causes phosphorus in the glass to react with the chromium and iron to produce metal phosphides at the hermetic sealing interface. Such reactions at the interface cause the nucleating agents in the glass ceramic at the interface portion to decrease, and thus result in a reduction of crystallinity of the glass ceramic at the interface. The decreased crystallinity may substantially lower the thermal expansion coefficient at the interface, and thus, may cause a composite body including such an interfacial region to crack when cooled during manufacturing, due to differential thermal expansion.

Further, IN-718 composite bodies have another drawback in that they are not easily laser weldable. As is well known in the art, it is highly desireable that the metal members utilized in such composite bodies are easily laser weldable to other metals as well as to each other. Lastly, since IN-718 alloy is primarily nickel based, it is relatively expensive.

Glass ceramic-metal composite bodies have also employed LAS glass ceramic in combination with the 300-series austenitic stainless steels. A frequently utilized 300-series alloy is 304-L and has the following composition: 18–20 wt% Cr, 8–12 wt% Ni, 0.03 wt% C, 2.0 wt% Mn, 1.0 wt% Si, and the remainder being Fe. However, as with the IN-718 alloys, these metals also suffer various drawbacks. For instance, the thermal expansion coefficients of the 300-series alloys are generally much higher than that of the LAS glass ceramic and thus, cracking at the hermetic interface often results during manufacture of these composite bodies. Further, the 300-series alloys also experience adverse reactions at the interface between the alloy member and the LAS glass ceramic. Furthermore, glass devitrification cycles utilized to obtain proper properties of the LAS glass ceramic degrade the tensile strength of the 300-series alloys to almost 50% that of its initial strength. These alloys cannot be strengthened by subsequent heat treatments and thus, the low strength which results after the glass devitrification cycle permanently remains in the composite body.

SUMMARY OF THE INVENTION

It is an object of the present invention to provide a superior hermetically sealed glass ceramic-metal composite body which does not encounter the above-discussed drawbacks of the conventional glass ceramic-metal composite bodies.

It is also an object of the present invention to form a superior glass ceramic-metal composite body utilizing judiciously selected materials while carefully controlling surface conditions of the metal member and heating cycles used in manufacturing the composite body.

The present invention relates to a hermetically sealed glass ceramic-metal composite body, comprising a substantially cylindrical metal member consisting essentially of an iron-based alloy containing 4.0–5.5 wt % Al, a substantially crystallized LAS glass ceramic member fixed within the metal member, and an interfacial layer between the metal member and the LAS glass ceramic member. The interfacial layer consists essentially of 100% aluminum oxide, which is provided by constituents of the metal member and constituents of the LAS glass ceramic member.

The present invention also relates to a method of making the superior hermetically sealed glass ceramic-metal composite body described above. The method of the present invention comprises providing a substantially cylindrical metal member consisting essentially of an iron-based alloy containing 4.0–5.5 wt % Al, providing a LAS glass material in abutting contact with the metal member, heating the abutted glass material and metal member at a temperature of about 650°–1100° C. to form a composite body, and cooling the composite body to form a resultant composite body having an interfacial layer, consisting essentially of aluminum oxide, between the metal member and the glass ceramic member, such that the interfacial layer consists of constituents of both the metal member and the glass ceramic member.

BRIEF DESCRIPTION OF THE DRAWINGS

The invention will be described in detail with reference to the attached Figures, wherein.

DESCRIPTION OF THE PREFERRED EMBODIMENTS

Figure 1:
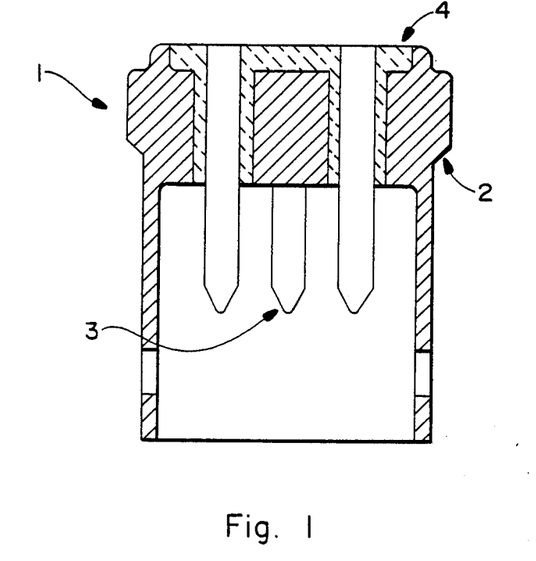
FIG. 1 illustrates an example of a glass ceramic-metal composite body according to the present invention.

FIG. 1 illustrates an example of a glass ceramic-metal composite body (1) according to the present invention. The composite body includes a substantially cylindrical metal housing member (2) and electrical feedthrough members (3). The electrical feedthrough members are hermetically sealed to the metal housing member through a LAS glass ceramic (4). The LAS glass ceramic must be substantially crystallized such that its thermal expansion coefficient substantially matches that of the metal housing member. It is also essential that the LAS glass ceramic be substantially crystallized such that it can withstand both the physical and chemical demands placed upon it during use. For example, the composite body shown in FIG. 1 can be used as a pyrotechnic device, such as an actuator.

It is preferred that the metal member of the present invention have the following composition: 9-11 wt% Cr, 20.5-25.0 wt% Ni, 4.0-5.5 wt% Al, not greater than 0.03 wt% C, not greater than 0.20 wt% Mn, not greater than 0.75 wt% Si, and the remainder being Fe. Alloys within these compositional ranges provide an adherent, substantially 100% $Al_2O_3$ layer on surfaces thereof, such that the surface of metal will not be chemically attacked by the LAS glass ceramic and visa versa. As noted above, the $Al_2O_3$ layer plays a crucial role in the formation of strong, durable LAS glass ceramic-metal composite bodies.

It is most preferred that metal alloys known as alloy 880, alloy 896, and alloy 899 be used. Alloy 880 has a composition of 9.73 wt% Cr, 24.5 wt% Ni, 4.77 wt% Al, 0.027 wt% C, 0.14 wt% Mn, 0.41 wt% Si, and the remainder being Fe. Alloy 896 has a composition of 10.6 wt% Cr, 22.1 wt% Ni, 4.15 wt% Al, 0.03 (max) wt% C, 0.20 (max) wt% Mn, 0.75 (max) wt% Si, and the remainder being Fe. Alloy 899 has a composition of 10.6 wt% Cr, 20.9 wt% Ni, 5.2 wt% Al, 0.03 (max) wt% C, 0.21 (max) wt% Mn, 0.53 (max) wt% Si, and the remainder being Fe.

The preferred LAS glass ceramic composition is a phosphate nucleated glass known as SB- glass and has the following composition: 75 wt% $SiO_2$, 12.3 wt% $Li_2O$, 4.3 wt% $Al_2O_3$, 4.2 wt% $K_2O$, 1.3 wt% $B_2O_3$, and 2.5 wt% $P_2O_5$.

Figure 2:
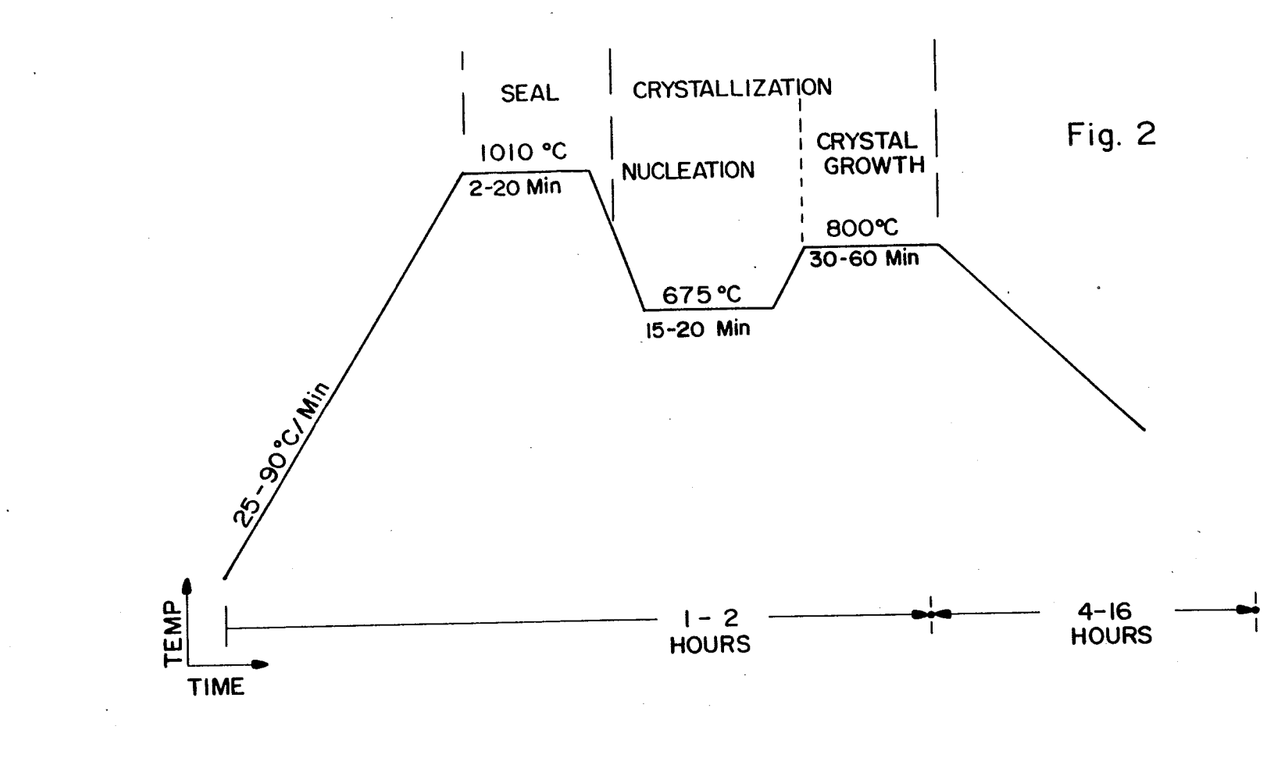
FIG. 2 illustrates a heating cycle used in manufacturing the composite body of the present invention.

The method of the present invention includes providing a substantially cylindrical metal member, such as that shown in FIG. 1, and abutting a LAS glass material thereto. The abutted members are then placed into a furnace, wherein the heating cycle shown in FIG. 2 is performed. The LAS glass material is abutted to the metal member in such a manner that during the heating cycle, gravity will allow the molten glass material to flow and bond to the metal member.

As can be seen in FIG. 2, the abutted glass material and metal member are heated to a temperature of about 650°-1100° C. for about 1-2 hours. It is preferred that the heating cycle include the sequential steps of heating at about 1000°-1020° C. for about 1-25 minutes to form the hermetic seal, heating at about 650°-700° C. for 10-30 minutes to nucleate the crystallites in the LAS glass material, and heating at about 775°-825° C. for about 20-70 minutes to substantially crystallize the LAS glass material into a LAS glass ceramic and thus form a composite body.

As can be seen from FIG. 2, the composite body of the present invention can be formed by utilizing a relatively short sealing cycle, during which time the metal member is simultaneously strengthened. More specifically, it has been discovered that the yield strength of the metallic member is increased during the heating cycle. Accordingly, although no post heat cycle precipitation treatment is necessary to strengthen the metal member, it has been discovered that post-heating the composite body at about 610° C. for about 2-10 hours further increases the strength properties of the metal member.

The resultant glass ceramic-metal composite body includes an interfacial layer between the metal member and the LAS glass ceramic member, wherein the interfacial layer consists essentially of aluminum oxide and includes constituents of both the metal member and the LAS glass ceramic member. The interfacial layer consisting essentially of $Al_2O_3$ provides the resultant glass ceramic-metallic composite body with superior hermetic sealing strength between the glass ceramic and the metal member and is essentially free of any deleterious reaction products which might decrease the thermal expansion coefficient of the interfacial region. Accordingly, the glass ceramic-metallic composite body according to the present invention does not experience cracking upon cooling during manufacture.

Figure 3A:
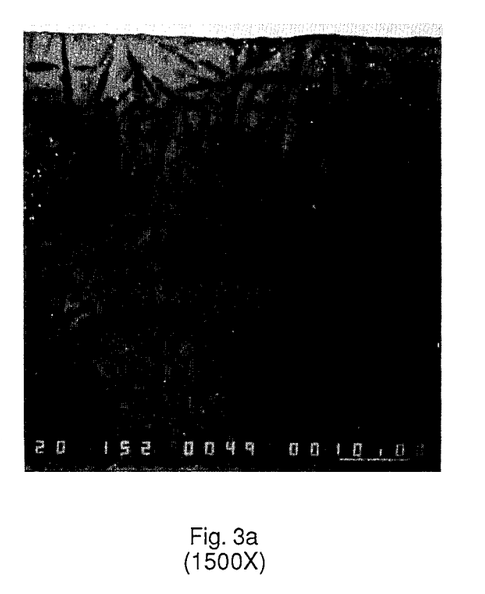
FIGS. 3a-3b illustrate scanning electron micrographs (hereinafter SEM photographs) of an interface between the metal and LAS glass ceramic of the present invention, wherein the surface of the metal shown in FIG. 3a has been pre-oxidized.
Figure 3B:
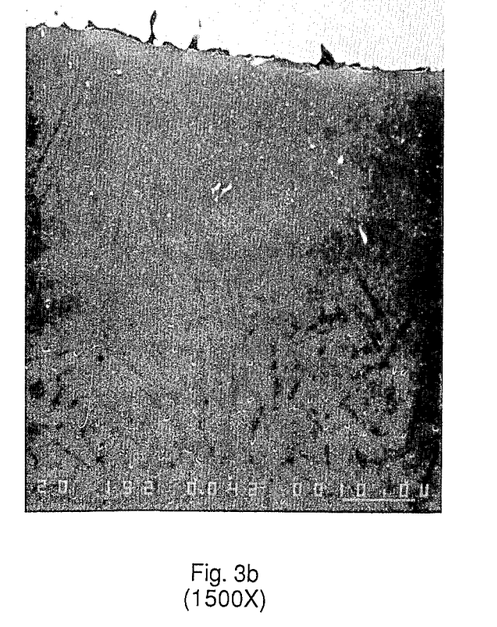

Although the metal member will include a thin $Al_2O_3$ layer thereon, it is most preferred to pre-oxidize the surface of the metal member prior to performing the heating cycle. It is preferred that the thickness of the pre-oxidized $Al_2O_3$ layer (essentially 100% $Al_2O_3$) on the metal member be in the range of 1-5 microns thick and more preferably, 1-2 microns thick. By pre-oxidizing the aluminum containing alloy used in the composite body according to the present invention, a tightly adhering aluminum oxide coating will form on the surface of the metal member. This tight adhering aluminum oxide coating forms an anchor for a strong, hermetic, glass ceramic-metal seal between the LAS glass and the aluminum containing metal member. Additionally, although the glass will partially dissolve the aluminum oxide layer, its presence will prevent migration of any metal constituents into the LAS glass material. Accordingly, no deleterious reactions will occur at the hermetic interface in the composite body of the present invention. This fact is clearly seen in FIGS. 3a–3b, wherein the metal member of FIG. 3a has been pre-oxidized while the metal member of FIG. 3b has not. As can be seen in FIG. 3b, the metal member is chemically attacked by the glass ceramic.

Figure 4A:
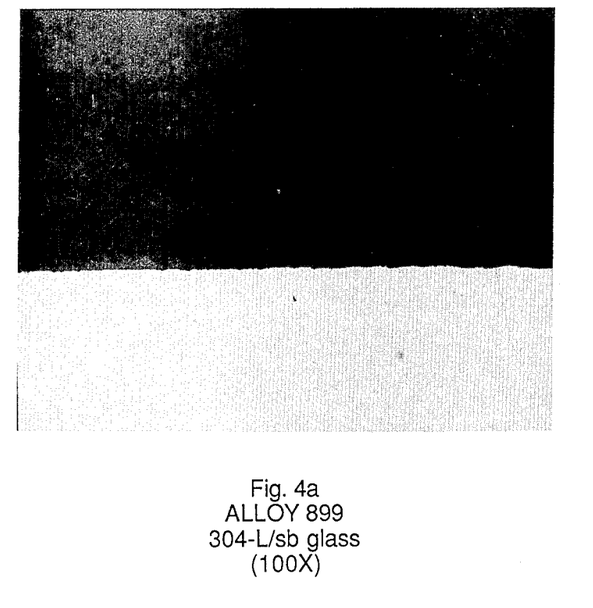
FIGS. 4a-4b illustrate optical micrographs taken at 100X of the glass/metal interface between the LAS glass ceramic and (a) alloy 899 and (b) alloy 304-L.
Figure 4B:
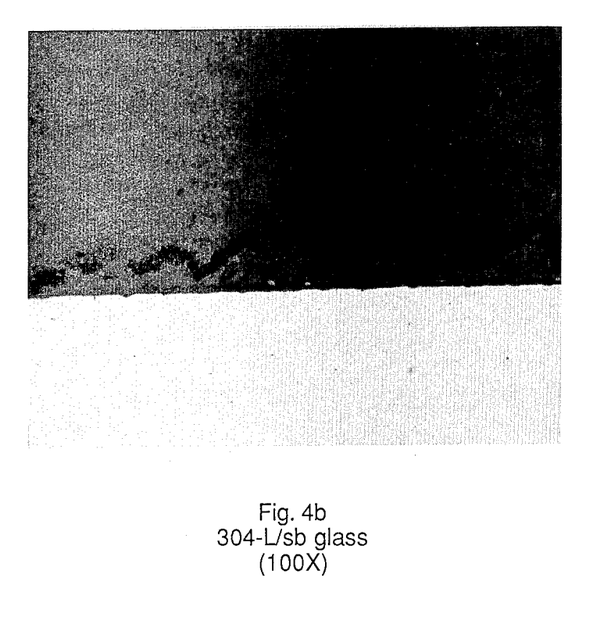

FIGS. 4(a)–4(b) illustrate optical micrographs taken at 100X of the hermetic interface between the LAS glass ceramic and (a) alloy 899 and (b) alloy 304-L, respectively. These figures are representative of the overall appearance of each interface. As can be seen from FIGS. 4(a), alloy 899 yielded a pore-free reaction zone with no visible cracks. The pore-free reaction zone of the 899 alloy is attributed to the interfacial $Al_2O_3$ region between the metal member and glass ceramic. Conversely, FIG. 4(b) shows that use of the 304-L alloy results in large pores and ultimately, separation, between the LAS glass ceramic and the metal member. Non-porous hermetic seals have also been successfully produced with alloy 896, as evidenced by FIG. 3a.

Figure 5:
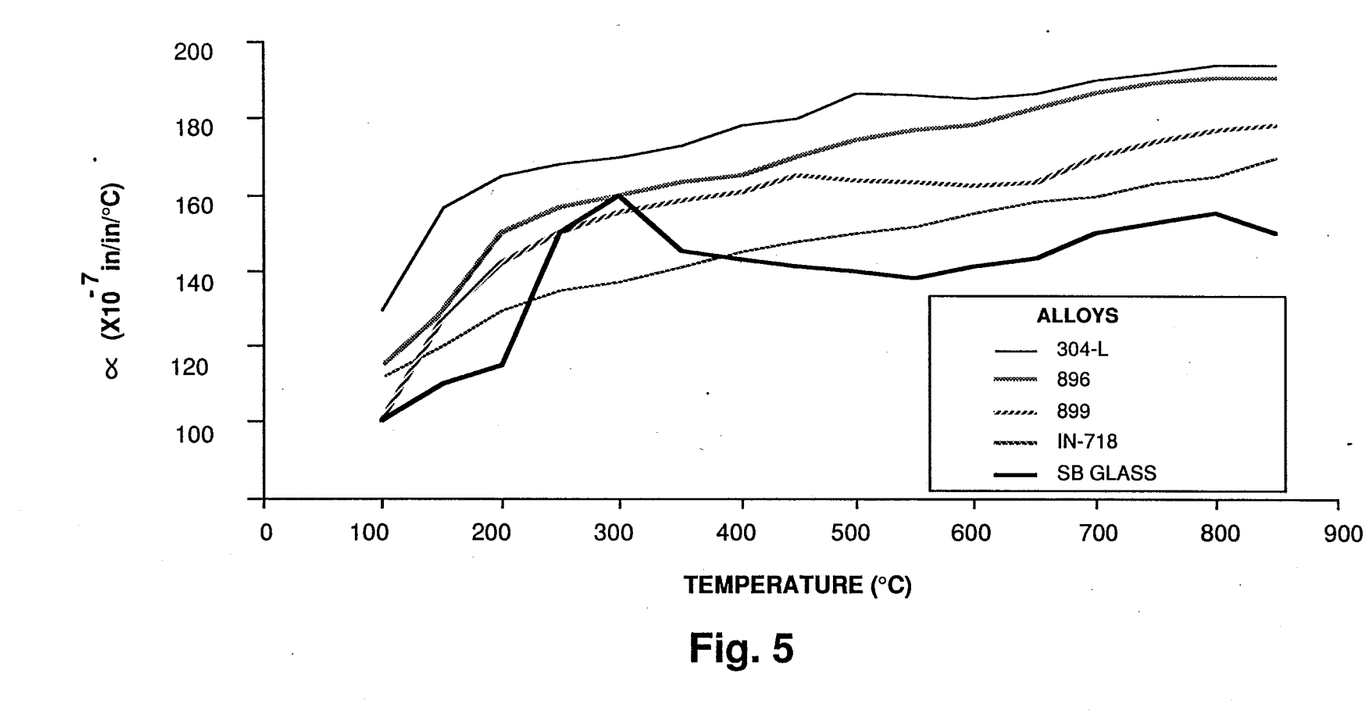
FIG. 5 illustrates a graph of thermal expansion coefficient versus temperature for the materials utilized in the composite body of the present invention, as well as materials utilized in conventional composite bodies.

FIG. 5 illustrates a graph of thermal expansion coefficient versus temperature for the alloys used as the metal members of the present invention, alloys used in conventional composite bodies, and SB-glass. As noted above, it is preferred that the metal member have a thermal expansion coefficient which closely matches, but is slightly greater than, that of the LAS glass ceramic. If the thermal expansion coefficient of the metal member is much greater than that of the LAS glass ceramic, then cracking at the hermetic interface will most likely occur during manufacture of the composite body. It is preferred that the metal member utilized in the composition body of the present invention have a thermal expansion coefficient on the order of $17 \times 10^{-6}/°C.$, while the thermal expansion coefficient of the LAS glass ceramic be on the order of about $15 \times 10^{-6}/°C$. As can be seen from FIG. 5, although the thermal expansion of IN-718 is preferred, the alloys utilized as the metal members in the composite body of the present invention also provide the desired compression forces without experiencing the drawbacks associated with IN-718. Although the 304-L alloy also exhibits the desired thermal expansion coefficient, it experiences other drawbacks which will be discussed hereinafter.

Figure 6A:
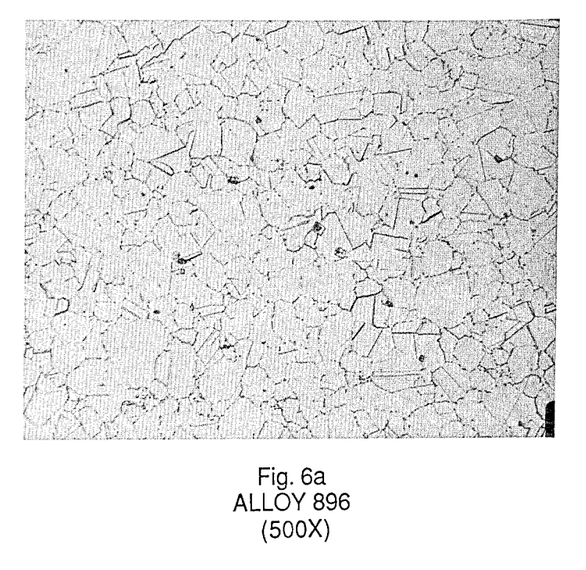
FIGS. 6a-6b illustrate optical micrographs of the metal alloy according to the present invention before the hermetic sealing process and after the sealing process.
Figure 6B:
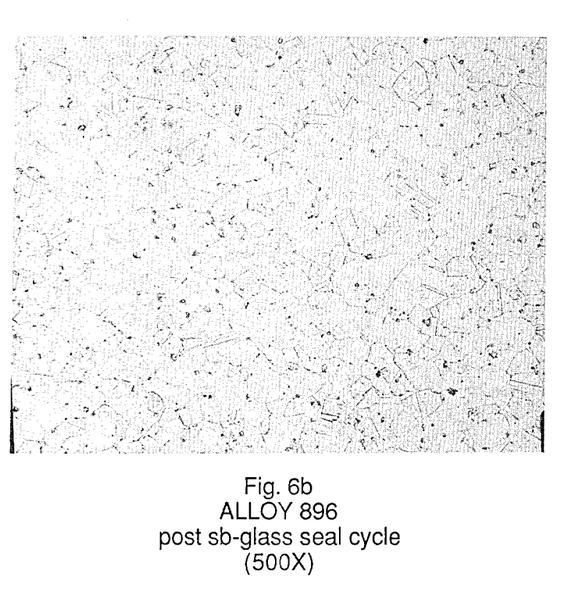

FIGS. 6a–6b illustrate optical microphotographs of the micro-structure of alloy 896 used as the metal member in the composite body of the present invention. FIG. 6a shows the microstructure of alloy 896 prior to the heat treatment used to form the hermetic seal, as shown in FIG. 2. FIG. 6b shows the microstructure of alloy 896 after the heat treatment used to form the hermetic seal, as shown in FIG. 2. As can be seen from FIG. 6b, the post sealed microstructure of the 896 alloy contains a dark secondary crystalline phase of NiAl, which is approximately 5–10 microns in size. FIGS. 6a–6b illustrate an advantage attributed to utilizing aluminum containing alloys as the metal member in the composite body of the present invention, in that the heat treatment necessary to manufacture the composite body contemporaneously improves the microstructure of alloy 896 via precipitation of the NiAl phase. Alloy 899 also exhibits the secondary NiAl phase phenomenon discussed above.

Figure 7:
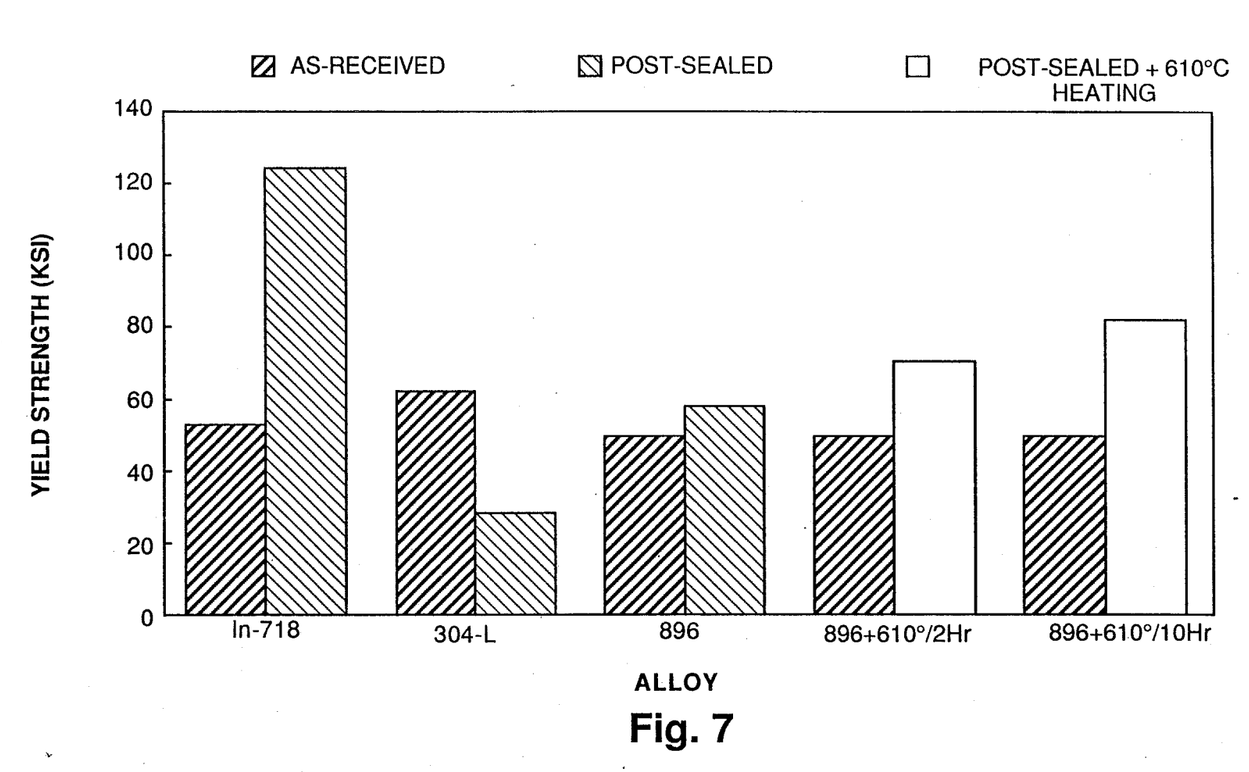
FIG. 7 illustrates the yield strengths of the metal members used in the present invention and conventional metal alloys, before and after a hermetic sealing treatment.

FIG. 7 illustrates the yield strengths (in KSI) of the alloys utilized in the composite body of the present invention as well as alloys utilized in conventional composite bodies. FIG. 7, taken in conjunction with FIG. 6b, illustrates that the NiAl precipitation phase strengthens the metal member of the composite body of the present invention. FIG. 7 also illustrates that the post-heating step at 610° C. for 2–10 hours further strengthens the metal member in the composite body of the present invention. It is preferred that the metal member have a yield strength of greater than 50 KSI and more preferably, greateer than 80 KSI.

Although the IN-718 alloy is also strengthened by the heat treatment, as discussed above, this alloy is readily susceptible to attack by the molten glass material during sealing. Additionally, FIG. 7 clearly illustrates that the yield strength of the 304-L alloy is degraded by the heat treatment. As noted above, this degradation in strength cannot be improved via subsequent heat treatments.

The following are Examples of the present invention as well as Comparative Examples utilizing conventional composite body materials. The Examples of the present invention are not intended to limit the scope of the appended claims in any manner, but are only presented to evidence the superiority of the composite body of the present invention, as well as the method of producing the composite body according to the present invention.

EXAMPLE 1

Figure 8:
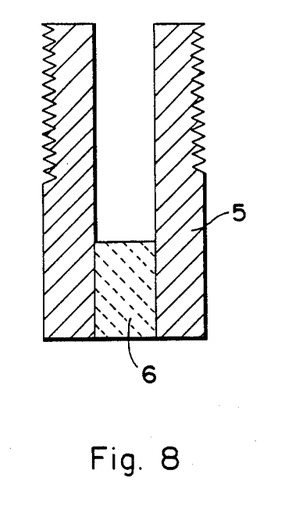
FIG. 8 illustrates a LAS glass ceramic-metal composite body used to test the bond strength of the hermetic seal.

FIG. 8 illustrates a scaled LAS glass ceramic-metal composite body for the purposes of testing the bond strength between the LAS glass ceramic and the metal member. Test shells (5) were machined from a bulk sample of alloy 896. The test shell had the following dimensions: height=0.750 inch; inside diameter=0.1562 inch; and outside diameter=0.250 inch. Following a standard cleaning process the shell was loaded with SB glass (6) and subjected to the seal/crystallization cycle shown in FIG. 2. The sealed unit was then machined to a constant glass depth and the bond strength between the LAS glass ceramic and metal member was determined by measuring the hydrostatic force necessary to shear the glass ceramic plug out of the unit (also known as hydrostatic burst testing). The average bond strength value of ten samples was 5200 psi (sigma±245 psi).

EXAMPLE 2

A test shell was machined from a bulk sample of the IN-718 alloy and sealed to a LAS glass ceramic in the manner described above in Example 1. The average bond strength value of the composite body including the Inconel 718 metal member was 3400 psi (sigma±500 psi).

EXAMPLE 3

To test the effects of different thermal expansion coefficients of the metal members in composite bodies, two test shells were machined from a bulk sample of Alloy 896 and a bulk sample of IN-718 in the same manner as described above, except the wall thickness of the metal members was decreased such that the inside diameter of the metal member was 0.179 inch. The test shells were both sealed to an SB-glass ceramic as in the Examples above. The average bond strength value of the alloy 896 composite body was 3995 psi (sigma±260 psi) and 3504 psi (sigma±817 psi) for the IN-718 composite body.

The significant difference between the bond strengths of the foregoing Examples is attributed to the interfacial aluminum oxide (substantially 100% $Al_2O_3$) layer in the composite body utilizing alloy 896 as the metal member. The superior bond strength exhibited by the 896 alloy composite body is also attributed to its higher thermal expansion coefficient as compared to that of IN-718. This fact is evidenced by the higher bond strengths exhibited by the test shells having the greater wall thicknesses. Stated differently, the higher thermal expansion coefficient alloy 896 composite body has a greater compression effect on the SB-glass ceramic.

EXAMPLE 4

To test the effects of pre-oxidizing the metallic member, a test shell was machined from a bulk sample of the 896 alloy as in Example 3 (i.e., thin-walled sample) and a glass ceramic-metal composite body was manufactured in the same manner as in Example 1 above, except that the surface of the metal member which contacts the glass ceramic was pre-oxidized before the heat treatment. The pre-oxidation treatment included heating the metal member at 1200° C. for 2 hours in an air atmosphere. The pre-oxidized composite body exhibited increased bond strength and the integrity of the hermetic seal, particularly, the interfacial aluminum oxide layer was more readily sustained, such that the thermal expansion coefficient of the interfacial region did not significantly differ from that of the metal member and LAS glass ceramic. The interfacial region between the metal member and the LAS glass ceramic is shown in FIG. 3a and discussed above.

EXAMPLE 5

Five test shells were machined from each of a bulk sample of Alloy 880 and a bulk sample of 304-L stainless steel in a similar manner to Example 1 above and were sealed to a LAS glass ceramic in the same manner. The dimensions of the metal member were: height=0.398 inch; inside diameter=0.248 inch; and outside diameter=0.250 inch. The average bond strength value of the composite body including the alloy 880 metal member was 5250 psi (sigma±177 psi) and 2826 psi (sigma±100 psi) for the composite body including the 304-L stainless steel member.

Lastly, although an express Example is not provided herein, the hermeticities of the composite bodies of the present invention were also tested. All bodies exhibited a hermeticity on the order of less than $1 \times 10^{-8}$ cm$^3$ STP of helium per second.

Although the present invention has been described herein with particular regard to specific embodiments thereof, it is understood that any modifications within the purview of those of ordinary skill are intended to be included within the scope of the following claims.

What is claimed is:

1. A hermetically sealed glass ceramic-metal composite body, comprising:
    a substantially cylindrical metal member consisting essentially of an austenitic stainless steel containing 4.0-5.5 wt % Al;
    a glass ceramic member fixed within said metal member, consisting essentially of a crystallized $Li_2O$-$Al_2O_3$-$SiO_2$ glass ceramic substantially free from amorphous material and having a thermal expansion coefficient substantially matching that of said metal member;
    an interfacial layer consisting essentially of $Al_2O_3$ between said metal member and said glass ceramic member, wherein the $Al_2O_3$ region consists of constituents of said metal member and constituents of said glass ceramic member.

2. A composite body according to claim 1, wherein said metal member has a yield strength of greater than about 50 KSI.

3. A composite body according to claim 1, wherein said metal member has a yield strength of greater than about 80 KSI.

4. A composite body according to claim 2, wherein said metal member contains a precipitation hardened secondary crystalline phase of NiAl.

5. A composite body according to claim 1, wherein said metal member has a thermal expansion coefficient of about $17 \times 10^{-6}$/°C. and said glass ceramic member has a thermal expansion coefficient of about $15 \times 10^{-6}$/°C.

6. A composite body according to claim 5, wherein a bond strength between said metal member and said ceramic member is greater than about 5000 psi.

7. A composite body according to claim 1, wherein the hermetic seal of said composite body has a leak rate of less than $1 \times 10^{-8}$ cm$^3$ STP of helium per second.

8. A composite body according to claim 1, wherein said metal member consists essentially of 9-11 wt % Cr, 20.5-25.0 wt % Ni, 4.0-5.5 wt % Al, not greater than 0.03 wt % C, not greater than 0.20 wt % Mn, not greater than 0.75 wt % Si, and the balance being Fe.

9. A composite body according to claim 1, wherein said glass ceramic is a phosphate-nucleated glass consisting essentially of about 75 wt % $SiO_2$, 12.3 wt % $Li_2O$, 4.3 wt % $Al_2O_3$, 4.2 wt % $K_2O$, 1.3 wt % $B_2O_3$, and 2.5 wt % $P_2O_5$.

* * * * *